US008204073B1

(12) United States Patent  
Gailloux et al.

(10) Patent No.: US 8,204,073 B1
(45) Date of Patent: Jun. 19, 2012

(54) PERSONALIZED TELEVISION

(75) Inventors: Michael A. Gailloux, Overland Park, KS (US); Devon L. Biere, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 627 days.

(21) Appl. No.: 11/466,643

(22) Filed: Aug. 23, 2006

(51) Int. Cl.
*H04J 3/16* (2006.01)
*H04B 7/00* (2006.01)
*H04M 1/725* (2006.01)
*H04M 3/42* (2006.01)

(52) U.S. Cl. ..... 370/437; 455/70; 455/412.1; 455/414.1
(58) Field of Classification Search .................. 370/437; 455/70, 414.1
See application file for complete search history.

(56) References Cited

U.S. PATENT DOCUMENTS

| 5,038,211 A * | 8/1991 | Hallenbeck ............. 348/460 |
| 6,553,222 B1 * | 4/2003 | Weiss ..................... 455/415 |
| 6,795,702 B2 * | 9/2004 | Sennett .................. 455/414.1 |
| 7,483,964 B1 * | 1/2009 | Jackson et al. ............ 709/221 |
| 2003/0073411 A1 * | 4/2003 | Meade, II ................... 455/70 |
| 2006/0194535 A1 | 8/2006 | Houldsworth et al. |
| 2008/0009268 A1 * | 1/2008 | Ramer et al. ............. 455/412.1 |

OTHER PUBLICATIONS

Final Office Action mailed Aug. 17, 2010, in U.S. Appl. No. 11/466,558.

* cited by examiner

*Primary Examiner* — Donald Mills
*Assistant Examiner* — Samina Choudhry

(57) ABSTRACT

A method, system, and medium providing personalized media content to a display device. The method includes receiving television programming at a media-receiving device from a content provider (where the media-receiving device includes a wireless-communications component that transmits to and receives data from a mobile communications device in a protocol via a wireless personal area network (PAN) that is effective within a distance range from the wireless-communications component), incident to a mobile communications device entering the distance range, receiving identifying indicia associated with the mobile communications device, communicating the identifying indicia to at least one database to retrieve profile data from at least one profile associated with the mobile communications device; and communicating personalized media content to the display device, the personalized media content based on at least a portion of the profile data associated with at least one profile associated with the mobile communications device.

14 Claims, 5 Drawing Sheets

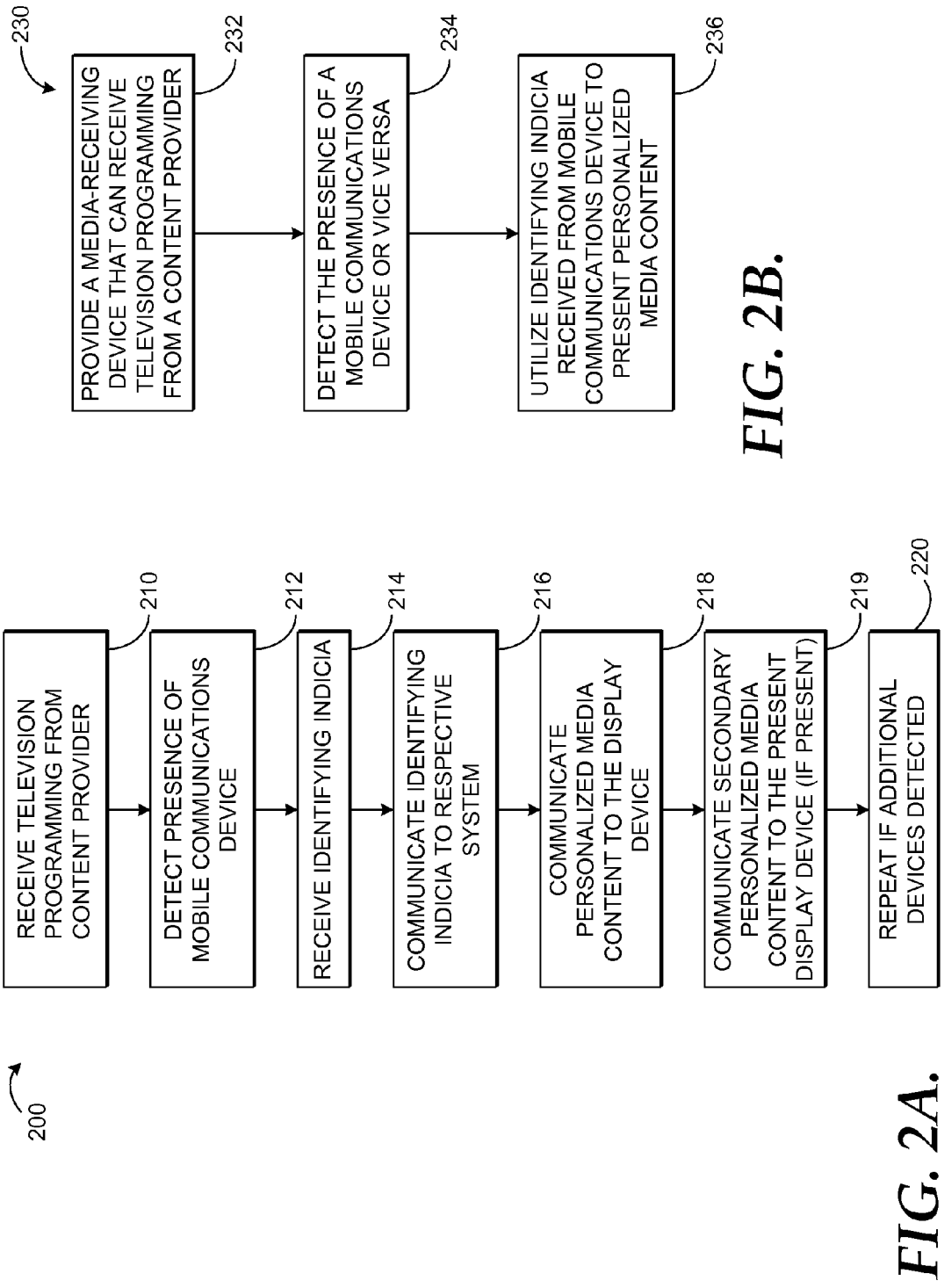

PERSONALIZED TELEVISION

CROSS-REFERENCE TO RELATED APPLICATIONS

This application is related by subject matter to the Application entitled "ENABLING COMMUNICATION BETWEEN END POINTS OF DIFFERENT NETWORKS" Ser. No. 11/466,558, filed on even date herewith, and which is incorporated by reference herein.

BACKGROUND

Historically, watching television (which, for purposes of this document includes cable programming, satellite, etc.) has been substantially unidirectional and not personalized. That is, a group of people watching a channel sees the same thing. They often see the same programming and the same advertisements. But different people have different interests, tastes, etc., and the current state of the art does not address this fact.

SUMMARY

The present invention is defined by the claims below, not this summary. Embodiments of the present invention provide a system, method, and product for, among other things, leveraging technologies of a wireless communications carrier with those of a media-content provider to personalize a television-viewing experience based on a user's mobile communications device. The present invention has several practical applications in the technical arts, including allowing vendors to more accurately target advertising to specific customers and allowing customers the benefit of indicating and receiving content based on their respective preferences.

In a first aspect, a set of computer-useable instructions for performing a method of providing personalized media content to a display device is provided. The method includes receiving television programming at a media-receiving device from a content provider. The media-receiving device includes a wireless communications component that transmits to and receives data from a mobile communications device in a protocol via a wireless personal area network (PAN) that is effective within a distance range from the wireless-communications component. Further, incident to a mobile communications device entering the distance range, receiving identifying indicia associated with the mobile communications device, communicating the identifying indicia to at least one database to retrieve profile data from at least one profile associated with the mobile communications device, and communicating personalized media content to the display device. The personalized media content is based on at least a portion of the profile data associated with at least one profile associated with the mobile communications device.

In a second aspect, a method for providing personalized media content to a display device includes providing a media-receiving device that can receive television programming from a content provider, wherein the media-receiving device includes a wireless-communications component that transmits to and receives data from a mobile communications device by way of a wireless personal area network; and incident to detecting the presence of a mobile communications device of a user, utilizing identifying indicia received from the mobile communications device to present personalized media content on a display device according to preference data associated with at least one user of the mobile communications device.

In a final illustrative aspect, a system for providing personalized media content to a display device includes a media-receiving device that is capable of receiving television programming from a content provider, a wireless-communications component communicatively coupled to the media-receiving device that transmits to and receives data from a mobile communications device in a protocol via a wireless personal area network (PAN), a memory communicatively coupled to the media-receiving device that stores at least a portion of the television programming from the content provider, and a profiles database communicatively coupled to the media-receiving device via one or more networks that store preference data of a user, the preference data being retrievable by the media-receiving device based on identifying information received from the mobile communications device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 2A-2B depict exemplary methods for customizing a television-viewing experience according to embodiments of the present invention.

DETAILED DESCRIPTION

Embodiments of the present invention provide systems and methods for personalizing a television-interaction experience based on one or more profiles associated with one or more mobile communications devices within a proximity of a media-receiving component, such as a cable end point or equivalent.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CATV | cable TV or cable television |
| IEEE | Institute of Electrical and Electronics Engineers |
| IP | Internet protocol |
| PAN | personal area network |
| STB | set-top box (a type of cable end point) |
| TV | television (programming, content, etc.) |

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a computer, and various other network devices. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1A:
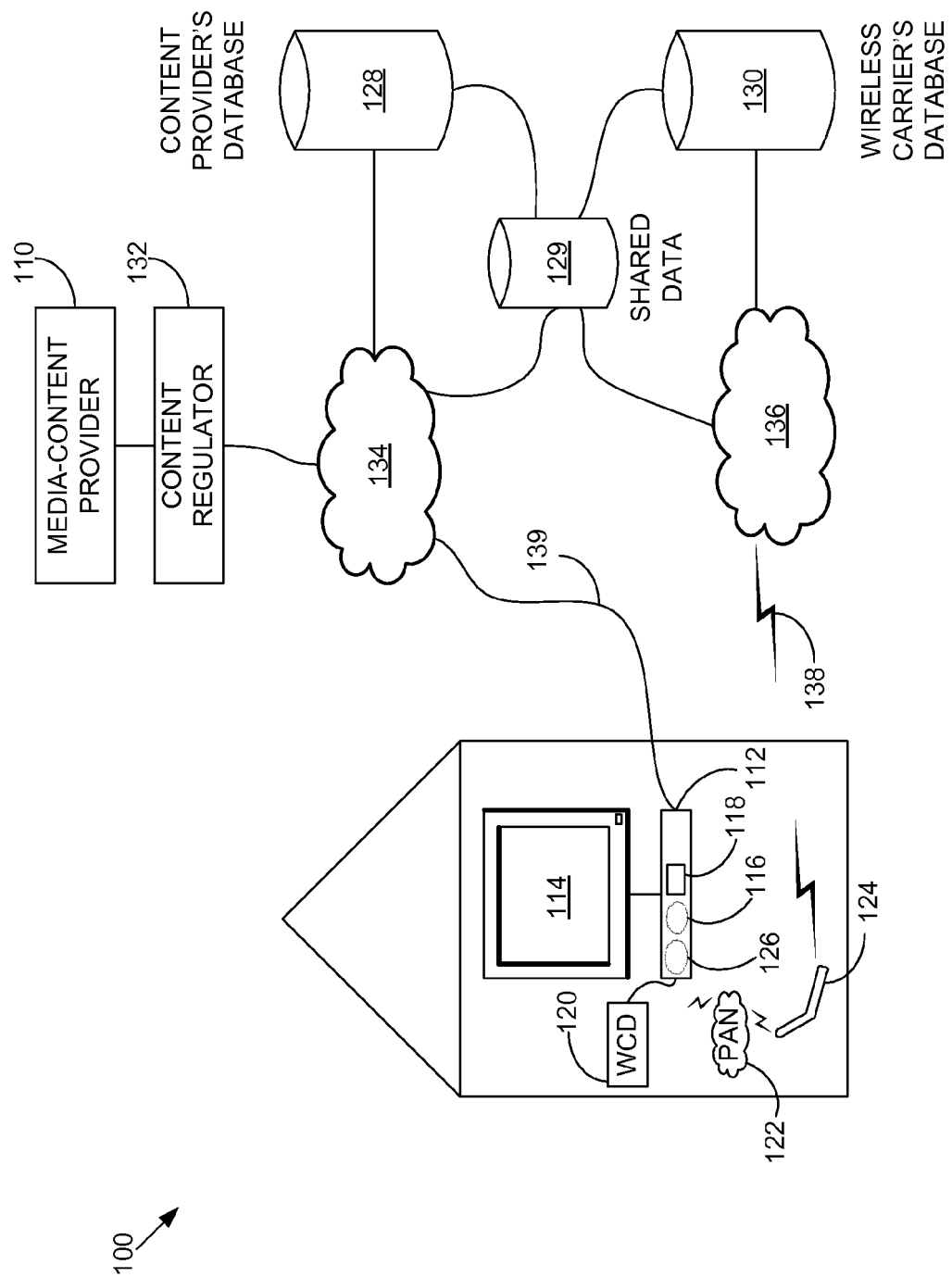
FIGS. 1A-1C depict illustrative operative environments suitable for practicing an embodiment of the present invention.

Turning now to FIG. 1A, an illustrative operating environment suitable for practicing an embodiment of the invention is provided and referenced generally by the numeral 100. FIG. 1A is illustrative in nature and should not be construed as limiting the present invention, as with all of the figures herein. In one embodiment, a media-content provider 110 provides media content ultimately to a cable end point 112. Media-content provider 110 is a source of media content that is provided to cable end point 112. Illustrative media content includes television programming, satellite programming, cable programming, over-the-air broadcasting, and the like. Media-content provider 110 may provide live, real-time footage such as when reporting news events, or programming that has been previously recorded, such as sitcoms, documentaries, pay-per-view movies, and the like.

Cable end point 112 may take on a variety of forms. The function that it provides is to decode or otherwise interpret a media stream provided by media-content provider 110 such that it is rendered or displayable on display device 114. In one embodiment, cable end point 112 is a stand-alone device (for example, a set-top box) that receives media from media-content provider 110, decodes, translates, or demodulates the content, and then renders it on display device 114. In other embodiments, cable end point 112 is embodied within display device 114 (somewhat akin to the same way that a stand alone DVD player or VHS-tape player is integrated into a display device such as a television set). This can be the case even though the display device is thin, such as a flat-panel display.

Thus, we will refer to cable end point 112 individually as though it were a separate component because this will help make various embodiments or aspects of the invention easier to understand. Although each figure depicts cable end point 112 in what appears to be a device separate from display device 114, such an integration is contemplated within the scope of an embodiment of the present invention. Cable end point 112 can feed media content received from media-content provider 110 straight through to display device 114, or it can store content received from media-content provider 110. Accordingly, reference numeral 116 denotes media content associated with cable end point 112. Media content 116 may be streaming content, delayed content, or content stored in a storage medium such as storage 118 for subsequent display.

In one embodiment, a wireless communications device 120 is coupled to cable end point 112. Wireless communications device 120 can take on a variety of forms. In one embodiment, it facilitates communication through a personal area network 122 to a mobile communications device 124. In such an embodiment, wireless communications device 120 may be what is referred to in the art as a "Bluetooth" device. A Bluetooth device is any device that can communicate using the Bluetooth protocol (or variation). The Bluetooth protocol, as with all protocols, will go through several variations. One version is currently described in the IEEE 802.15 standard, which is incorporated herein by reference to more particularly describe what is meant by "the Bluetooth protocol." Typically, later-developed devices are backwards compatible; thus, the current invention contemplates devices that will be invented in the future that can communicate over at least a variation of a Bluetooth protocol or equivalent thereof.

Figure 1B:
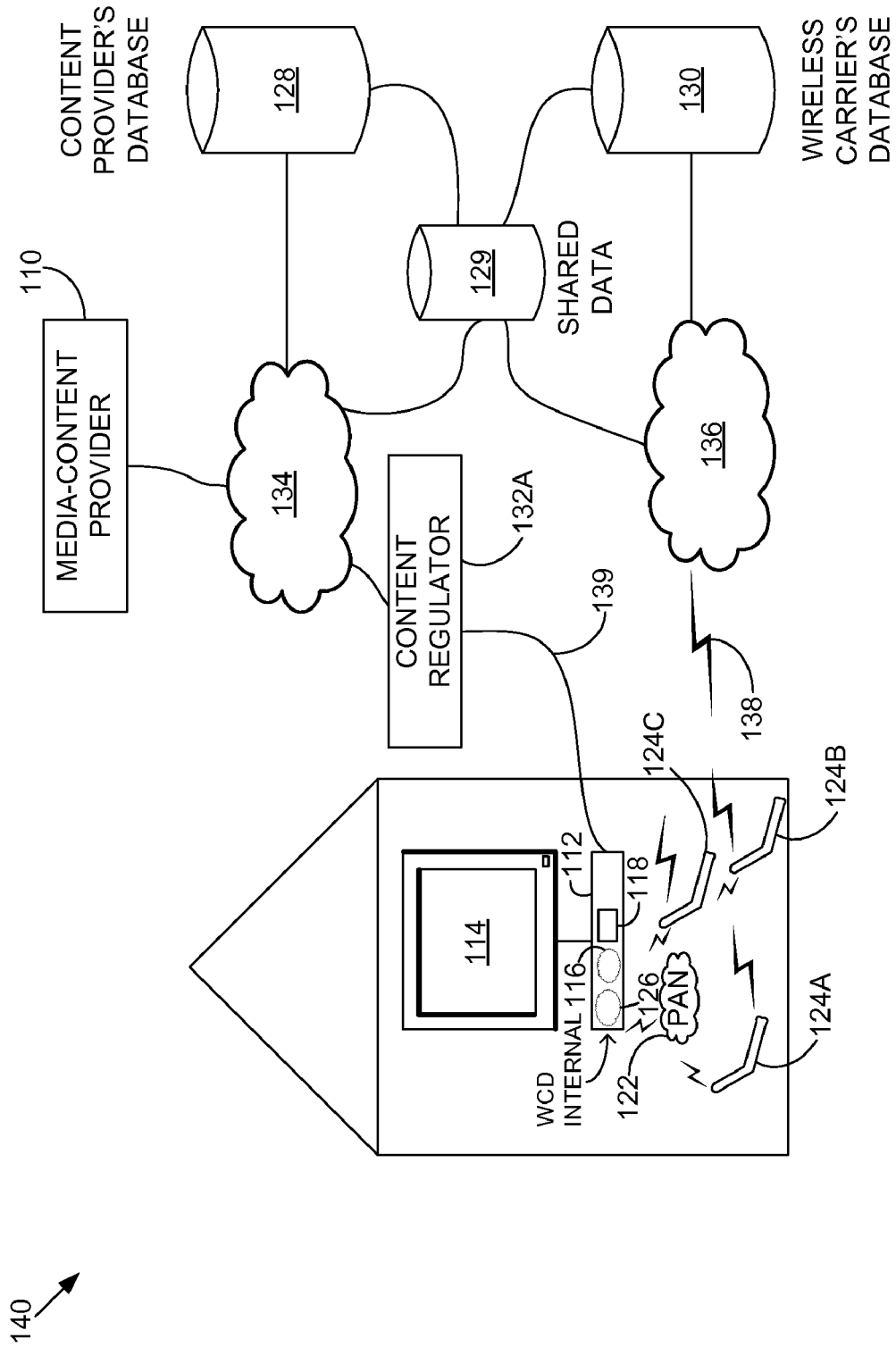

Wireless communications device 120 communicates via a wireless personal area network (PAN) 122 with mobile communications device 124. In one embodiment, wireless communications device 120 is separate from cable end point 112. This can take the form of a Bluetooth device being coupled to a cable end point via a cable such as a universal serial bus (USB) cable. Other potential connections include a serial connection, parallel connection, an IEEE 1394 firewire connection, and the like. In an alternative embodiment, wireless communications device 120 can be integrated into cable end point 112. This embodiment is shown in FIG. 1B, which will be discussed in greater detail below.

As mentioned, wireless communications device 120 facilitates communication between cable end point 112 and mobile communications device 124 via a wireless personal area network 122. Wireless personal area network 122 is a network that communicates data within ranges on the order of feet or tens of feet in one embodiment. In an alternative embodiment, the range can be greater than tens of feet, but for purposes of explanation herein, it will be assumed that the range is on the order of tens of feet. Personal area network 122 is a computer network that is used for facilitating communication among computing devices (including devices such as mobile communications device 124) that are within a certain proximity of each other. Personal area network 122 can be used to communicate among various personal devices, which will be underscored with reference to FIG. 1B.

Mobile communications device 124 can take the form of a mobile phone, personal data assistant, Blackberry® type device, or the like. Any device capable of communicating via a common protocol through personal area network 122 to cable end point 112 is contemplated within the scope of the present invention.

Cable end point 112 also includes an application 126 that offers various functional aspects associated with an embodiment of the present invention. In a first aspect, application 126 serves as an interface between cable end point 112 and wireless communications 120. In another aspect, it facilitates the communication and reception of commands from mobile communications device 124. And in another aspect, it facilitates the presentation of a user interface that allows the data to enter data through the cable end point and ultimately be stored in a database such as a content provider's database 128 and/or a wireless carrier's database 130 or others. This will be explained in greater detail below.

In one embodiment, media-content provider 110 sends content through a content regulator 132 that regulates unfiltered content from media-content provider 110 so that at least a portion of such content is communicated through a network 134 to cable end point 112. In one embodiment, network 134 takes the form of a media network, and another network 136 takes the form of a communications network. However, the distinctions between the two are gray at best. Thus network 134 could easily be referred to as a communications network and network 136 could easily be referred to as a media network. The two networks are shown separately and will be referred to herein as separate because such will make the invention easier to understand, however one of ordinary skill in the art would appreciate that such networks are not necessarily separate, but can overlap or even be the same network.

Similarly, we show a first database 128 as a database associated with the content provider, and another database 130 as a database associated with a wireless carrier. However, the content provider's database 128 and a wireless carrier's database 130 may not be as separate as shown. That is, service offerings may merge whereby telecommunications companies provide media-related services and vice versa. Accordingly, databases 128 and 130 may not be completely separate databases, but again, are shown separate in connection with explaining the present invention. Portions of data that are desired to be shared between databases 128 and 130 can be shared in shared database 129. As used herein, a "database" can include any collection of records including a single table. Shared data 129 may take the form of a table of data that is shared between databases 128 and 130. Accordingly, we will use the term "shared data" in connection with reference numeral 129.

As will be explained in greater detail below, when mobile communications device 124 enters the proximity of PAN 122, identifying indicia associated with mobile communications device 124 will be used to evaluate profile data associated with the device to provide personalized content that will ultimately be displayed on display device 114. This content can be regulated in various ways. For example, the content regulator may be positioned before network 134 so that raw content from media-content provider 110 is filtered before entering content network 134. In an alternative embodiment, and with reference to FIG. 1B, content regulator 132A can be positioned after content network 134 so that content is regulated prior to entering cable end point 112, but after passing through communications network 134.

In such an embodiment, a more local head end or similar system may be employed to intercept raw content communicated through content network 134 and filter the same based on profile data associated with at least one mobile communications 124. With continuing reference to FIG. 1B, an embodiment is shown wherein multiple mobile communications devices 124A, 124B, and 124C are shown as being capable of communicating with cable end point 112. In this embodiment, wireless communications device 120 is internal to cable end point 112, but not shown so as to not obscure the present invention. In this embodiment, multiple profiles associated with multiple devices can be evaluated so that certain content can ultimately be displayed on display device 114 based on the collective profile data associated with the various devices. This will also be explained in greater detail below.

Figure 1C:
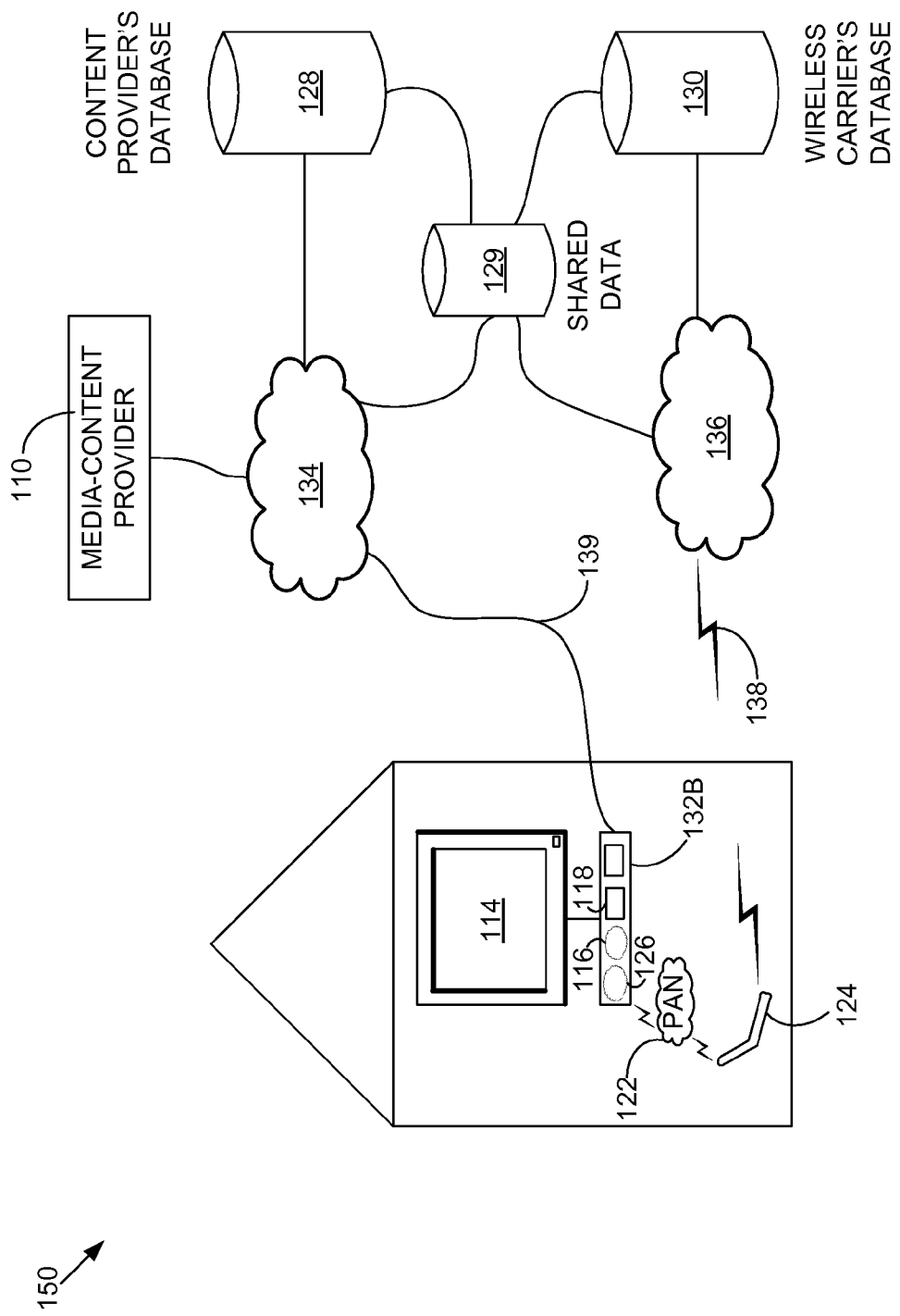

In a final illustrative operating environment 150, shown in FIG. 1C, the content regulator has been brought into cable end point 112 and is referenced by the numeral 132B. In this embodiment, raw media from media-content provider 110 can be communicated to cable end point 112, which will then filter or enrich the content based on profile data associated with a device such as mobile communications device 124.

Turning now to FIG. 2A, an illustrative method for practicing the present invention is provided and referenced generally by the numeral 200. In one embodiment, a first exemplary step includes receiving television programming from a content provider such as media-content provider 110 at a step 200. Television programming here includes any programming sent from media-content provider 110 and is used herein synonymously with the term "media content." Thus, television programming can include advertisements, cable television, satellite television, live feeds, delayed feeds, etc. Although we employ the use of the word "television," we intend to encompass a variety of display devices such as a plasma device, a flat-panel device, an LCD device, a TFT device, and any other device capable of displaying the content from media-content provider 110.

At a step 212, the presence of mobile communications device 124 is detected. This can happen in a variety of ways. For example, various ways are described in the aforementioned Application entitled "Enabling Communication Between End Points Of Different Networks" Ser. No. 11/466,558, which is incorporated by reference for the purpose of illustrating ways in which mobile communications device 124 may be detected.

In a first way, wireless communications device 120 detects the presence of mobile communications device 124 by virtue of personal area network 122 and a protocol such as the Bluetooth protocol. The Bluetooth protocol is such that when a device enters within range of another Bluetooth device, the presence of each is detected. Thus, in an alternative embodiment, mobile communications device 124 detects the presence of wireless communications device 120, but in either case data can be communicated through a communications link between the mobile communications device 124 and cable end point 112.

At a step 214, identifying indicia associated with mobile communications device 124 was received by cable end point 112. Illustrative identifying indicia may include a phone number associated with the device. Other illustrative identifying indicia may include a person's name associated with the communications device or an IP address or any other unique identifier or combination of identifiers that identify mobile communications device 124.

At a step 216, identifying indicia is communicated to at least one database. This too can happen in a variety of ways. In one embodiment, the identifying indicia is provided by a wireless link 138 to the wireless carrier's database 130. Or in an alternative embodiment, the identifying indicia can be provided by a link 139 to the content provider's database 128. Either method is acceptable because in at least one embodiment, preference data stored in a profile associated with mobile communicating device 124 is stored in either the content provider's database 128 and/or the wireless carrier's database 130, and each is accessible to the other, or such relevant data is shared as shared data 129. Thus, it does not matter whether data is communicated via a wireless link 138 or link 139 because the identifying indicia can be used to query shared data 129.

In one embodiment, shared data 129 includes profile data associated with mobile communications device 124. The profile data includes various preferences that are stored normally by the owner of mobile communications device 124, although the preference data does not need to necessarily be associated with the owner. For instance a parent may own and pay the bill of a child's mobile phone, however the profile data associated with the mobile device 124 can be associated with the preferences of the child (nonowner) rather than the owner parent.

With the identifying indicia communicated from wireless device 120 or cable end point 112 to the respective system or delivery interface, personalized media content can be communicated to display device 114 at a step 218 via cable end point 112 because the identifying indicia is utilized to retrieve at least one profile associated with mobile communications device 124. That profile can then be evaluated to determine preferences, that in turn can be used to determine content to be displayed on display device 114. Additional, or secondary, personalized media content can be sent at a step 219, and the process repeated if additional devices are detected (represented by numeral 220).

In one embodiment, the personalized media content (or also the second content) displayed on display device 114 takes the form of advertisements that are displayed based on the preference data queried. Currently, during a national broadcast, such as national sporting event, advertising spots are inserted into a localized media stream. That is, local content is displayed to a user while watching a nationally televised program. Illustrative local content includes items such as local news, an announcement to watch local news, or advertising from local vendors. In one embodiment, personalized content is introduced in a manner similar to the way localized content is introduced in a nationally televised program. For example, if a profile reflects that a user is interested in tools, then an advertisement of a vendor associated with providing tools is displayed on display device 114. The options are almost boundless.

For example, if a first device is associated with a profile that depicts an interest in tools and in politics, but a second device is detected that is silent at the tools but does indicate an interest in politics, then the collective preference data associated with multiple files can be evaluated so that an advertisement consistent with the most profiles is displayed; and in this case a political advertisement. The profiles may provide as granular a data as a provider wishes. For example, profile data may include a user's address, hobbies or interests; an income level; media preferences including programming preferences; a political indication; a religious indication; an age indication; familial data; and user-generated preferences, which would allow the user to define his or her own category and then populate that category.

In still another embodiment, personalized media content may be communicated to cable end point 112 and ultimately displayed on display device 114 even during television programming. For instance, a user may be watching a show that depicts a meat gadget, and based on a profile tying the user to mobile device 124, and an indication of an interest in things such as new gadgets, an overlay may be presented that tells the user that there is an option to receive additional data of the device if desired by pressing a certain key sequence or otherwise indicating an interest in receiving data (such as pressing a button on a conventional remote-control device). If such an interest indication is received, then information can be communicated from the cable end point 112 to the mobile communications device 124. This could happen by the user entering a command on mobile communications device 124, which communicates a preference to receive additional data directly or indirectly through network 136 and/or network 134 so that media content can be provided, for example, through link 139 to cable end point 112, and then communicated over personal area network 122 to mobile communications device 124.

Thus, in some embodiments cable end point 112 may persistently be storing various types of data in storage 118 to create localized media content 116 in one embodiment. Thus, at any given time application 126 already exists on cable end point at the time an indication is received as to a desire to receive additional information. In this embodiment, communication of relatively more high bandwidth data is done by virtue of personal area network 122 instead of wireless communications link 138.

Similarly, not only may a personal advertisement be received but also personalized content within an advertisement, including personalized interactive options that expose options to a viewer based on functional capabilities associated with mobile communications device 124. That is, if mobile communications device 124 has the capability to render video, then during the presentation of a reality series or talent show, a request can be displayed on display device 114 requesting whether a user desires to receive an additional video clip of the current performer in one embodiment. And if so, because it is known that the device is capable of rendering such video, which is why the option was initially exposed. If the user indicates that receiving such a video would be desired, then such can be sent from cable end point 112 to mobile communications device 124.

As previously mentioned, programming itself can be personalized based on the profile stored in one or more databases 128, 130, 136. Thus if the user indicates that he or she is interested in do-it-yourself projects, then such programming can be automatically retrieved via application 126. This can be done out of band and not in real time. That is, without user intervention, a search can be made of a directory listing associated with a content provider such as media-content provider 110 to identify shows that are most closely related to the preferences in shared data 129, and that programming can be sent to cable end point 112 and stored thereon for subsequent display on display device 114. As storage capacities continue to increase, storage 118 can hold many hours, days, or even weeks of programming.

As previously mentioned, a user's profile can include an array of information indicating a user's likes as well as dislikes. That is, a user may configure a profile to indicate that he or she does not wish to receive certain types of programming or advertisements. This information can be used by content regulator 132A or 132B so as to prevent certain types of programming from being displayed on display device 114.

Turning now to FIG. 2B, a second illustrative method for practicing an embodiment of the present invention is provided in reference generally by the numeral 230. At a step 232, a media-receiving device that can receive television programming from a content provider is provided. In one embodiment, a media-receiving device includes cable end point 112 but could be any device that is capable of receiving television programming, as previously discussed, from content provider such as media-content provider 110. At a step 234, the presence of a mobile communications device or vice versa is detected. By "vice versa" we mean to convey the concept that media-receiving device 112 may detect a presence of mobile communications device 124 or mobile communications device 124 may detect a presence of media-receiving device 112. But once each device knows about the other, identifying indicia can be received from the mobile communications device and utilized to present personalized media content at a step 236. Utilizing identifying indicia includes communicating at least a portion of the identifying indicia to a profile database to correlate profile data with the user, and then to receive indications of user preferences associated with the user. As previously mentioned, a profile's database may take the form of shared data 129.

Not all of the identifying indicia communicated from wireless device 124 needs to be utilized to determine a profile associated with mobile communications device 124 in some embodiments. That is, mobile communications device 124 may communicate unnecessary or additional information to media-receiving device 112, information that is not necessary to adequately identify mobile communications device 124, but which may be useful in further identifying optimal personalized media content to ultimately be displayed on display device 114. As mentioned, the personalized media content may be personalized prior to being received by media-receiving device 112 or after being received at media-receiving device 112.

Figure 3:
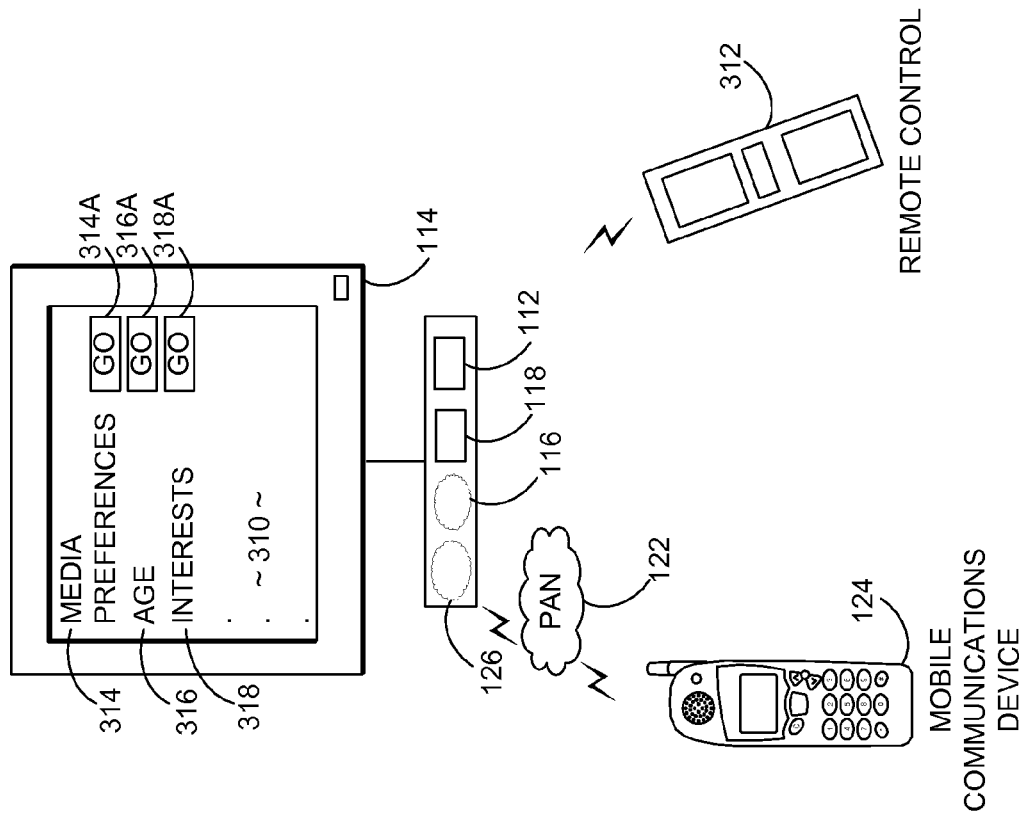
FIG. 3 depicts an illustrative user interface for receiving preference data according to an embodiment of the present invention.

The profile stored in databases 128, 130, or 136 may be populated in a variety of ways. A first method includes exposing an interface via the Internet so that the owner or other interested user of mobile communications device 124 or subscriber to media-content services can log in and enter the desired preferences. In an alternative embodiment, application 126 may be used to present a user interface 310 on display device 114 that allows a user to populate his or her profile using a remote control such as remote control 312, as shown in FIG. 3. In this embodiment, cable end point 112 and mobile communications device 124 recognize each other, and user interface 310 is displayed to a user with a variety of options to configure. For example, a "media preferences" link 314 is illustrative shown with a corresponding activation button 314A that, when followed, presents an alpha numeric menu (not shown) whereby a user can enter one or more media preferences. Similarly, an "age" link 316 is provided as well as a general interest link 318, with corresponding action buttons 316A and 318A. Links 314-318 are illustrative in nature and merely indicate that virtually any type of interest option could be presented to a user on display device 114 in this embodiment. Alternatively, part or all of the user profile might be derived, rather than user-specified, based on analyses of user behavior, purchases, activities, and other transactions. The profile might also be enhanced through supplemental data sources such as billing information, credit scores, marketing surveys, and demographic data.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of providing personalized media content to a display device, the method comprising:

receiving television programming at a media-receiving device from a content provider, wherein the media-receiving device includes a wireless-communications component that transmits to and receives data from a plurality of mobile communications devices in a protocol via a wireless personal area network (PAN) that is effective within a distance range from the wireless-communications component, wherein the mobile communications devices are each is associated with a wireless communications carrier and are configured to communicate with their respective wireless communications carrier;

incident to the mobile communications devices entering the distance range, receiving at the media-receiving device identifying indicia associated with the mobile communications devices, wherein the identifying indicia is received from the mobile communications devices via the wireless PAN, and wherein the identifying indicia uniquely identifies each the mobile communications devices;

querying at least one remote database from the media-receiving device by communicating the identifying indicia from the media-receiving devices to the remote database to retrieve profile data that includes media programming preferences from a profile associated with each of the mobile communications devices, wherein each profile is stored in the at least one remote database, and wherein the at least one remote database is associated with at least one of the content provider and the respective wireless communications carrier and is accessible to both the content provider and the wireless communications carrier;

receiving, at the media-receiving device, the profile data that includes the media programming preference, wherein the profile data is received in response to the query by the media-receiving device;

communicating personalized media content from the media-receiving device to the display device, wherein the personalized media content is based on at least a collective portion of the profile data received by the media-receiving device from the at least one remote database, wherein the profile data is associated with the identifying indicia received from the mobile communications devices; and communicating the personalized media content from the media-receiving device via the wireless PAN to the mobile communications devices.

2. The media of claim 1, wherein television programming includes one or more of cable television (CATV) programming, satellite programming, or broadcast programming.

3. The media of claim 1, wherein the media-receiving device includes a cable end point or a device integrated into the display device that is capable of rendering media content provided by the content provider.

4. The media of claim 1, wherein the mobile communications device includes a mobile phone, personal data assistant (PDA), or other media device capable of receiving content compatible with the protocol via the wireless PAN.

5. The media of claim 4, wherein the protocol includes a version or variation of the Bluetooth protocol, and wherein the Bluetooth protocol is one that complies with a version of the IEEE 802.15 standard.

6. The media of claim 1, wherein the identifying indicia includes a unique identifier associated with the mobile communications device, and wherein the unique identifier includes one or more selections of the following associated with the mobile communications device:

a phone number;
a network access identifier;
a username;
an account number;
a billing identifier;
an IF address; or
a device serial number.

7. The media of claim 1, wherein the profile data include one or more selections from the following:

a device-type indication that indicates a type of mobile communications device;
technological capabilities of the mobile communications device;
a user's name;
a user's address;
hobbies or interests;

an income level;
media preferences including programming preferences;
a political indication;
a religious indication;
an age indication;
familial data; or
user-generated preferences.

8. The media of claim 1, wherein the personalized media content includes one or more of:
a personalized advertisement;
a personalized coupon;
personalized content within an advertisement, including personalized interactive options that expose options to a viewer based on a set of capabilities associated with the mobile communications device; or
personalized programming content.

9. The media of claim 1, further comprising:
incident to a second mobile communications device entering the distance range, receiving a set of identifying indicia associated with the second mobile communications device;
communicating the set of identifying indicia to at least one database to retrieve collective profile data from at least one profile associated with the second mobile communications device; and
communicating collective personalized media content to the display device, the collective personalized media content based on at least a portion of the collective profile data.

10. A method for providing personalized media content to a display device, the method comprising:
providing a cable end-point that can receive television programming from a content provider, wherein the cable end-point includes a wireless-communications component that transmits to and receives data from mobile communications devices by way of a wireless personal area network;
detecting the presence of a first mobile communications device of a first user, wherein the first mobile communications device is configured to communicate with a wireless communications carrier;
incident to detecting the presence of the first mobile communications device, utilizing identifying indicia that uniquely identifies the first mobile communications device, received by the cable end-point from the first mobile communications device, to present personalized media content on a display device according to media programming preference data associated with the first user, wherein the media programming preference data is stored in a remote database that is accessible to the content provider and the wireless communication carrier, and wherein at least a portion of the identifying indicia is utilized by the cable end-point to retrieve the preference data from the remote database;
detecting the presence of one or more other mobile communications devices of one or more other users while the first mobile communications device is present, wherein the first user and the one or more other users constitute multiple users;
incident to detecting the presence of the one or more other mobile communications devices while the first mobile communications device is present, retrieving media programming preference data associated with the one or more other users from the remote database;
evaluating collective media programming preference data that includes the media programming preference data associated with the one or more other users and the media programming preference data associated with the first user, wherein evaluating the collective media programming preference data includes identifying a preference that is common among most of the multiple users;
based on evaluating the collective media programming preference data, selecting personalized media content that is consistent the preference that is common among most of the multiple users; and
presenting the personalized media content on the display device.

11. The method of claim 10, wherein utilizing identifying indicia received from the first mobile communications device to present personalized media content includes:
communicating at least a portion of the identifying indicia to a profiles database to correlate profile data with the first user; and
receiving indications of user preferences associated with the first user.

12. The method of claim 11, wherein the personalized media content is personalized prior to being received by the cable end-point.

13. The method of claim 11, wherein the personalized media content is personalized after being received by the cable end-point.

14. The method of claim 10, further comprising presenting displaying a user interface on the display device to receive, via a remote control device, preferences to be associated with a user and stored in the remote database in a profile associated with the user's mobile communications device via a mobile communications device.

* * * * *